US007151573B2

(12) United States Patent
Kim et al.

(10) Patent No.: US 7,151,573 B2
(45) Date of Patent: Dec. 19, 2006

(54) CHANNEL EQUALIZER AND DIGITAL TELEVISION RECEIVER USING THE SAME

(75) Inventors: Joon Tae Kim, Yongin-si (KR); Sung Ryong Hong, Seongnam-si (KR); In Hwan Choi, Seoul (KR); Kyung Won Kang, Seoul (KR); Jong Woong Shin, Changnyeong-gun (KR); Byoung Gill Kim, Seoul (KR); Woo Chan Kim, Seongnam-si (KR); Jae Hyoung Kim, Incheon (KR)

(73) Assignee: LG Electronics Inc., Seoul (KR)

( * ) Notice: Subject to any disclaimer, the term of this patent is extended or adjusted under 35 U.S.C. 154(b) by 485 days.

(21) Appl. No.: 10/734,413

(22) Filed: Dec. 12, 2003

(65) Prior Publication Data

US 2004/0125235 A1 Jul. 1, 2004

(30) Foreign Application Priority Data

Dec. 14, 2002 (KR) ...................... 10-2002-0079963

(51) Int. Cl.
*H04N 5/21* (2006.01)

(52) U.S. Cl. ..................................... 348/607; 348/614
(58) Field of Classification Search ................ 348/614, 348/607, 624, 914; 375/229, 232, 286, 346, 375/260; *H04N 5/21, 5/213*
See application file for complete search history.

(56) References Cited

U.S. PATENT DOCUMENTS 6,754,262 B1 * 6/2004 Citta et al. .................. 375/232
6,771,591 B1 * 8/2004 Belotserkovsky et al. .. 375/232

* cited by examiner

*Primary Examiner*—Sherrie Hsia
(74) *Attorney, Agent, or Firm*—Lee, Hong, Degerman, Kang & Schmadeka

(57) ABSTRACT

Disclosed are a channel equalizer and digital television receiver using the same. The equalizer comprises a channel estimator, a channel distortion compensator and noise canceller. The channel estimator estimates an impulse response of a transmission channel from a received signal. The channel distortion compensator transforms and processes the received signal and the estimated impulse response. The noise canceller predicts and eliminates amplified noise generated during equalization.

40 Claims, 7 Drawing Sheets

CHANNEL EQUALIZER AND DIGITAL TELEVISION RECEIVER USING THE SAME

This application claims the benefit of the Korean Application No. P2002-79963 filed on Dec. 14, 2002, which is hereby incorporated by reference.

BACKGROUND OF THE INVENTION

1. Field of the Invention

The present invention relates to a channel equalizer used in a frequency domain and a digital television receiver using the same.

2. Discussion of the Related Art

In a general digital communication system, a transmitter maps digital information such as voice, data and image onto symbols, converts each symbol into an analog signal proportional to an amplitude or a phase corresponding to the symbol, and transmits the analog signal to a receiver through a transmission channel. The signal transmitted to the receiver is interfered with adjacent signal during its passing through the transmission channel of multiple paths, so that the signal is distorted very seriously. In order to restore the original signal from a distorted signal, an equalizer is essentially employed to compensate a channel. In general, the most widely used channel equalizer is a decision feedback equalizer (DFE) that uses LMS algorithm. When signals are received through a multiple path channel, the DFE regards the path through which the signal having the largest energy is received as a main path, and regards the remaining paths as reflection paths through which an inter-symbol interference (ISI) or ghost signals are received. Then, the DFE corrects and extracts the phase and the amplitude of only the signal received through the main path and eliminates the signals received through the remaining paths.

FIG. 1 illustrates a configuration of a general decision feedback equalizer operating in a time domain, that is, a time domain equalizer. Referring to FIG. 1, a feed forward filter 101 removes the affection of the signals (pre-ghost signals) of paths, which are received before the signal of the main path, and a feedback filter 102 removes the affection of the signals (pre-ghost signals) of paths, which are received after the signal of the main path. An adder 105 adds the output of the feed forward filter 101 and the output of the feedback filter 102, and outputs the sum of the outputs to a decision unit 103. The decision unit 103 compares the output signal of the adder 105 with a predetermined reference value to determine the output signal of the adder 105 to be at the nearest signal level. Here, the output of the decision unit 103 is fed back to the feedback filter 102 and the control unit 104.

Accordingly, when the decision unit 103 made a exact decision, noises are eliminated from the output of the decision unit 103 and the output of the decision unit 103 is inputted to the feedback filter 102 again. So, the noise is not amplified and the time domain equalizer shown in FIG. 1 is usually better than the linear equalizers in performance.

Also, if a decision error is negligible, the time domain equalizer can have similar performance to that of the maximum likelihood sequence estimator (MLSE).

However, if channel distortion is too serious, the decision error occurs frequently on the decision value inputted to the feedback filter 102 and the wrong decision value is infinitively looped in the feedback filter 102. So, the time domain equalizer can deteriorate in its performance. This situation is called error propagation situation. If the main path is cut and only the signals passing through the reflection paths exist, or if the same signal is transmitted though different paths from multiple antenna (this network is, so called, a single frequency network (SFN), the energies of the signals received through the paths are similar to one another so that it is unclear which signal of them is the main signal. In other words, in case the locations of a main path and a reflection path in the time domain equalizer are occasionally changed, the time domain equalizer deteriorates in performance and frame synchronization changes frequently so that channel decoding performed in a rear stage of the equalizer is impossible.

In this situation, it is meaningless to distinguish a main signal from reflection signals and the DFE cannot equalize the signals correctly so that the DFE is not proper to multiple path and SFN channel compensation.

SUMMARY OF THE INVENTION

Accordingly, the present invention is directed to a channel equalizer and a digital television receiver using the same, which substantially obviate one or more problems due to limitations and disadvantages of the related art.

An object of the present invention is to provide a channel equalizer and a digital television receiver using the same, in which the affection of channel estimation value is minimized when a channel is equalized in frequency domain so that the channel equalizer and the digital television receiver has constant equalization performance even in case an estimation channel error exists or in the dynamic channel situation that changes faster than appearance frequency of a training signal.

Another object of the present invention is to provide a channel equalizer and a digital television receiver using the same, in which frequency domain equalization is performed using an initial coefficient of the frequency domain equalization for channel estimation value obtained by means of a training sequence and using an LMS adaptive algorithm for data duration so that the channel equalizer and the digital television receiver has excellent performance in mobile receiving environment.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, the present invention provides a channel equalizer. The channel equalizer estimates a channel by using a training signal, obtains a frequency response of an inverse channel from the estimated channel, uses the obtained frequency response as an initial coefficient of the frequency domain equalizer, and performs frequency domain equalization with respect to a data period by using an LMS adaptive algorithm so that a constant equalization performance can be obtained even in case an estimation channel error exists or in the dynamic channel situation that the frequency is changed faster than appearance frequency of a training signal.

Also, the inventive channel equalizer allows a robust reception performance to be exhibited even in a moving reception circumstance as well as a fixed reception circumstance by overcoming equalization failure and synchronization failure of data frame resulted from the impossible discrimination between a main path and a reflection path under an environment of multiple paths or a single frequency network (SFN), which are problems of the conventional equalizer.

In another aspect of the invention, a channel equalizer for restoring an original signal from a digital television received signal that past through a channel, comprises: a channel estimator for estimating an impulse response of a transmission channel from a received signal having past through the transmission channel, thereby estimating the transmission channel; a channel distortion compensator for converting the received signal and the impulse response of the estimated transmission channel into frequency domain signals, setting a reciprocal of the impulse response of the estimated transmission channel in a frequency domain as an initial coefficient, updating the coefficients continuously in data duration, compensating distortion of the received signal converted into the frequency domain, and converting the compensated received signal back into a time domain; and a noise canceller for predicting a noise from an output of the channel distortion compensator, the noise being amplified when equalized, and eliminating the amplified noise contained in the time domain signal outputted from the channel distortion compensator.

The channel estimator detects a training period, calculating a cross-correlation between a training signal past through the channel during the training period and a training signal preset by a receiver, and outputting the calculated cross-correlation as the impulse response of the estimated transmission channel.

The channel estimator detects a training period, calculating a cross-correlation between a training signal past through the channel during the training period and a training signal preset by a receiver, multiplying the cross-correlation and an inverse matrix of an auto-correlation matrix of the training signal, and outputting the multiplication result as the impulse response of the estimated transmission channel.

The channel estimator detects a training period, calculating a cross-correlation between a training signal past through the channel during the training period and a training signal preset by a receiver, multiplying the cross-correlation and an inverse matrix of an auto-correlation matrix of the training signal, and outputting an average of the multiplication result and the impulse response of the estimated transmission channel of a previous frame as the impulse response of the estimated transmission channel.

The channel distortion compensator comprises: a first fast Fourier transform (FFT) unit for converting the received signal from the time domain into the frequency domain; a second FFT unit for converting the impulse response of the transmission channel estimated by the channel estimator from the time domain into the frequency domain; a ROM for in advance tabling and storing frequency responses corresponding to an inverse channel of the transmission channel of the frequency domain, and selectively outputting a frequency response corresponding to an inverse channel of the estimated transmission channel, which was outputted from the second FFT unit; and a frequency domain equalizer for receiving the frequency response of the inverse channel outputted from the ROM, setting the frequency response as an initial coefficient, receiving a channel equalized signal fed back in data duration, updating the coefficient continuously, compensating the distortion of the received signal converted into the frequency domain, and converting the compensated received signal back into the time domain.

The first FFT unit overlaps a received data block whose length is M and a previous data block, and converts the received data block into the frequency domain.

The second FFT unit augments zeros to the impulse response of the estimated channel, whose length is M, so that a size of the augmented impulse response matches a size N of an FFT block, and converts the augmented impulse response into the frequency domain.

The frequency domain equalizer comprises: a coefficient bank for receiving the frequency response of the inverse channel outputted from the ROM, setting the frequency response as an initial coefficient for frequency domain equalization, and storing and outputting coefficients that are updated continuously in the data duration; a first complex multiplier for multiplying the received frequency domain signal outputted from the first FFT unit and a coefficient outputted from the coefficient bank and compensating the channel distortion contained in the received frequency domain signal; an IFFT unit for converting the received frequency domain signal, which is outputted from the first complex multiplier and from which distortion was compensated, back into the time domain; a third FFT unit for receiving an error signal, a difference between an output of the IFFT unit and the signal from which a noise was eliminated by the noise canceller, and converting the error signal into the frequency domain; a complex conjugate generator for outputting complex conjugate values of the received frequency domain signal outputted from the first FFT unit; a second complex multiplier for multiplying an output of the third FFT unit and an output of the complex conjugate generator; a multiplier for multiplying an output of the second complex multiplier and a step size ($\alpha$); and an adder for adding an output of the multiplier and a previous coefficient fed back from the coefficient bank thereby updating a coefficient, and outputting the updated coefficient to the coefficient bank.

The IFFT unit extracts only rear M samples from N signals converted into the time domain and outputs the extracted rear M samples to the noise canceller.

The third FFT unit augments zeros to a front of the error signal whose length is M so that a size of the augmented error signal matches a size N of an FFT block, and converts the augmented error signal into the frequency domain.

The noise canceller comprises: a noise predictor for extracting only colored noises from an output of the channel distortion compensator by using the output of the channel distortion compensator and a decision value of a signal from which an amplified noise is eliminated and which is fed back, and predicting the noise amplified when equalized; and a first subtracter for subtracting the noise predicted by the noise predictor from the output of the channel distortion compensator, thereby whitening the noise.

The noise canceller further comprises: a decision unit connected to an output terminal of the noise canceller, for outputting a decision value nearest to a signal which is outputted from the noise canceller and from which the amplified noise is eliminated; a multiplexer for feeding the training signal back to the noise predictor in a training period and feeding back the decision value nearest to the signal from which the noise was eliminated to the noise predictor in a data duration; and a second subtracter for outputting as an error signal a difference between a signal outputted through the multiplexer and an output signal of the channel distortion compensator to the third FFT unit of the channel distortion compensator.

In another aspect of the present invention, a channel equalizer for restoring an original signal from a digital television received signal that past through a channel, comprises: a channel distortion compensator for converting the received signal into a frequency domain, receiving a channel equalized signal fed back, updating coefficients continuously, compensating distortion of the received signal converted into the frequency domain, and converting the compensated received signal back into a time domain; and a noise canceller for predicting a noise from an output of the channel distortion compensator, the noise being amplified when channel equalization is performed, eliminating the amplified noise contained in the time domain signal outputted from the channel distortion compensator, and feeding the time domain signal back to the channel distortion compensator so as to update a coefficient.

The channel equalizer further comprises a channel estimator positioned at a front of the channel distortion compensator, for estimating an impulse response of a transmission channel from a received signal having past through the transmission channel, converting the estimated impulse response into the frequency domain, and downloading a reciprocal of the impulse response of the estimated transmission channel in a frequency domain as an initial coefficient of the channel distortion compensator for the equalization in the frequency domain.

In another aspect of the present invention, a channel equalizer for restoring an original signal from a digital television received signal that past through a channel, the channel equalizer comprises: a channel estimator for estimating an impulse response of a transmission channel from a received signal having past through the transmission channel, thereby estimating the transmission channel; and a channel distortion compensator for converting the received signal and the impulse response of the estimated transmission channel into frequency domain signals, setting a reciprocal of the impulse response of the estimated transmission channel in a frequency domain as an initial coefficient, receiving a channel equalized signal fed back in data duration, updating the coefficients continuously, compensating distortion of the received signal converted into the frequency domain, and converting the compensated received signal back into a time domain.

The channel equalizer further comprises a noise canceller for predicting a noise from an output of the channel distortion compensator, the noise being amplified when equalized, and eliminating the amplified noise contained in the time domain signal outputted from the channel distortion compensator.

In another aspect of the present invention, a digital television receiver comprises: a demodulator for digitalizing a received signal demodulating the digitalized signal into a base band signal; a channel estimator for estimating an impulse response of a transmission channel from an output signal of the demodulator; a channel distortion compensator for converting the received base band signal and the impulse response of the estimated transmission channel into frequency domain signals, setting a reciprocal of the impulse response of the estimated transmission channel in a frequency domain as an initial coefficient, receiving channel equalized data fed back in data duration, updating the coefficients continuously, compensating distortion of the received signal converted into the frequency domain, and converting the compensated received signal back into a time domain; a noise canceller for predicting a noise from an output of the channel distortion compensator, the noise being amplified when equalized, and eliminating the amplified noise contained in the time domain signal outputted from the channel distortion compensator; and an error compensator for compensating a phase and an error of data outputted from the noise canceller and outputting the compensated data for channel decoding.

Other objects, characteristics and advantages of the present invention will be clear through the description of the embodiments referring to the accompanied drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
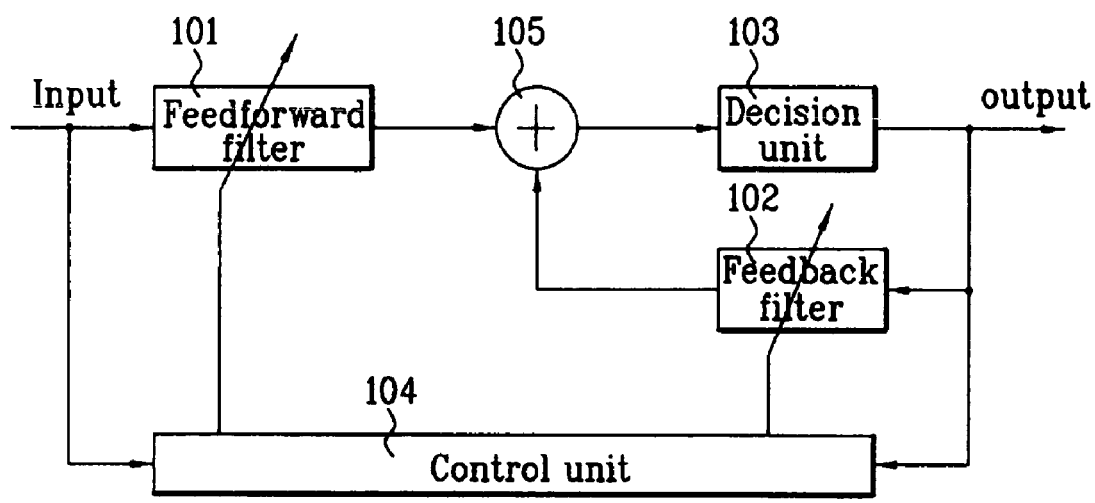
FIG. 1 illustrates a configuration of a conventional decision feedback equalizer operating in a time domain.
Figure 2:
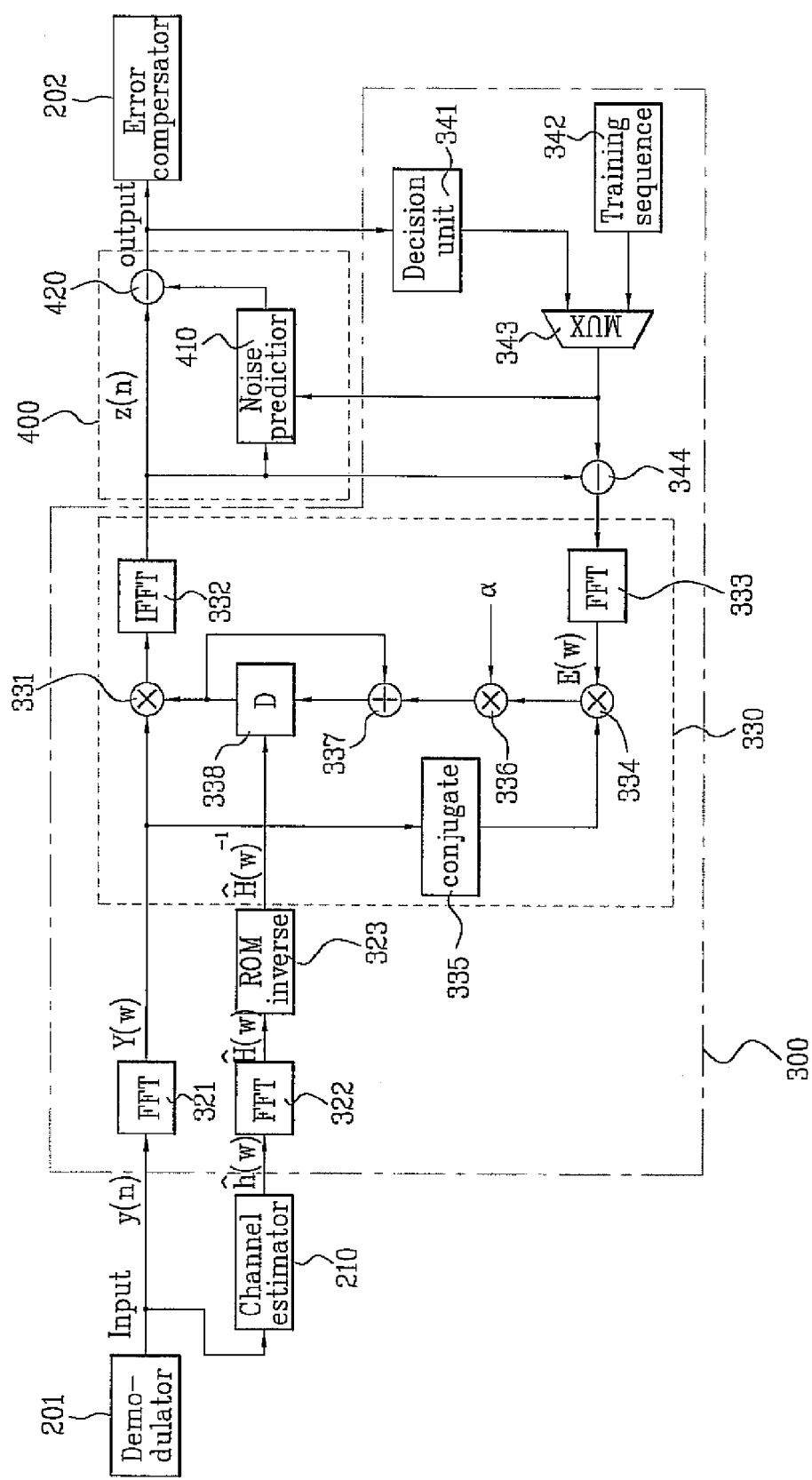
FIG. 2 illustrates a configuration of a channel equalizer operating in a frequency domain according to an embodiment of the present invention.

FIG. 2 is a block diagram illustrating the entire configuration of a channel equalizer of a digital television receiver according to the present invention. A channel equalizer comprises a channel estimator 210, a channel distortion compensator 300 and a noise canceller 400. The channel estimator 210 estimates a transmission channel in a time domain by using a training signal. A channel distortion compensator 300 converts the estimated transmission channel into a frequency domain, uses the frequency response of the inverse channel of the estimated transmission channel (converted) into the frequency domain as an initial coefficient for frequency domain equalization, adaptively equalize the channel-distorted data. The noise canceller 400 eliminates the noise contained in the time domain output data of the channel distortion compensator.

The channel distortion compensator 300 comprises a first fast Fourier transform (FFT) unit 321, a second FFT unit 322, a ROM 323, and a frequency domain equalizer 330. The first FFT unit 321 converts the received signal from the time domain into the frequency domain. The second FFT unit 322 converts the transmission channel estimated by the channel estimator 210 from the time domain into the frequency domain. The ROM 323 in advance tables and stores frequency responses corresponding to an inverse channel of the transmission channel of the frequency domain, and outputs a frequency response corresponding to an inverse channel of the estimated transmission channel converted into the frequency domain. The frequency domain equalizer 330 uses, as an initial coefficient, the frequency response of the inverse channel outputted from the ROM 323 when performing frequency domain equalization on the input signal outputted from the first FFT 321, and adaptively equalizes the distorted transmission channel signal for the data duration with the initial coefficient by using the LMS algorithm and compensates the channel distortion.

The frequency domain equalizer comprises a coefficient bank 338, a first complex multiplier 331, an IFFT unit 332, a third FFT unit 333, a complex conjugate generator 335, a second complex multiplier 334, a multiplier 336 and an adder 337. The coefficient bank 338 uses the frequency response outputted from the ROM 323 as an initial coefficient and stores coefficients necessary to channel equalization. The first complex multiplier 331 multiplies the frequency domain signal outputted from the first FFT unit 321 and a coefficient outputted from the coefficient bank 338 and compensates the channel distortion contained in the frequency domain signal outputted from the first FFT unit 321. The IFFT unit 332 converts the frequency domain signal, which is outputted from the first complex multiplier and from which distortion was compensated, back into the time domain. The third FFT unit 333 receives an error signal, a difference between an output of the IFFT unit and the signal from which a noise was eliminated by the noise canceller, and converting the error signal into the frequency domain. The complex conjugate generator 335 outputs complex conjugate values of the frequency domain signal outputted from the first FFT unit 321. The second complex multiplier 334 multiplies an output of the third FFT unit 333 and an output of the complex conjugate generator 335. The multiplier 336 multiplies an output of the second complex multiplier 334 and a step size ($\alpha$). The adder 337 adds an output of the multiplier 336 and an output of the coefficient bank 338 to update a coefficient, and stores the updated coefficient in the coefficient bank 338.

In the present invention configured as described above, the input signal inputted to the receiver can be presented as the following equation.

$$y(n) = \sum_k h(k) \cdot x(n-k) + w(n) \quad \text{Equation 1}$$

where x(n) is a transmitted signal, h(n) is an impulse response of discrete equivalent channel, w(n) is a white noise, and y(n) is the input signal inputted to the receiver.

As shown in FIG. 2, the channel estimator 210 estimates an impulse response h(n) of the discrete equivalent channel through which an original signal x(n) is considered to have past, and outputs an estimated value $\hat{h}(n)$ of finite impulse response of the channel to the second FFT unit 322 of the channel distortion compensator 300.

Here, the simplest channel estimation method of the channel estimator 210 is called a simple correlation method (SCM). In SCM, the training signal added periodically to the transmitted signal is supposed to be a white signal and the training period is detected. Then, cross-correlation of the training signal that past through the channel for the training period and the training signal that the receiver knows is obtained and the cross-correlation is outputted as the estimated channel impulse response.

The above-mentioned SCM is so simple to be implemented by simple hardware. However, when the training signal does not have a white signal property, the estimation error is large. Furthermore, the larger the channel estimated area is, the more the estimation is influenced by the data on both sides of the training signal. So, it is impossible to exactly estimate a channel.

Meanwhile, in the least square method (LSM) known to be more exact method, compared with SCM, it is possible to exactly estimate a channel even if the train signal does not have white signal property. In other word, the training period is detected and the cross-correlation value p of the training signal that past through the channel for the training period and the training signal that the receiver knows is obtained. The auto-correlation matrix R of the training signal is obtained. The matrix calculation of $R^{-1} \cdot P$ is performed to remove the auto-correlation existing in the cross-correlation value p of the received signal and the original training signal. So, it is possible to more exactly estimate a channel. In the LSM, the auto-correlation matrix R is an identity matrix when the training signal is a white signal. So, in that case, the SCM and the LSM have the same result. In the LSM, compared with the SCM, it is possible to more exactly estimate a channel owing to complex implementation. When the channel estimation area becomes larger, LSM is influenced by data as much as the SCM.

To solve this problem, average LS estimation method is suggested. In other words, in the average LS estimation method, the channel estimation value of the LSM is properly filtered and averaged so that the influence from the data is minimized. For example, the training period is detected and the cross-correlation value of the training signal that past through the channel for the training period and the training signal preset by the receiver is calculated. The cross-correlation value p and an inverse matrix $R^{-1}$ of the auto-correlation matrix are multiplied and the average of the multiplication result $R^{-1} \cdot R$ and the stored impulse response of the estimation channel of the previous frame is outputted as the impulse response of the estimated channel.

The channel estimator 210 may include any one of the inexact channel estimators of the SCM or the LSM as well as average LS estimation method.

As described above, a finite impulse response estimated value $\hat{h}(n)$ of the channel estimated by the channel estimator 210 by using any one of the channel estimation methods is outputted to the second FFT unit 322 of the channel distortion compensator 300.

In other words, since the channel equalization is performed in the frequency domain, the second FFT unit 322 converts a time domain impulse response $\hat{h}(n)$ of an estimated channel into the frequency domain. The impulse response $\hat{H}(w)$ of the channel, which was converted into the frequency domain, is outputted to the ROM 323.

Here, since the block size of the second FFT unit 322 is N and the number of the actually estimated frequency responses is M, the second FFT unit 322 augments M zeros to M frequency responses to expand the responses to the size of 2M=N and converts the expanded responses into a frequency domain.

The ROM 323 stores the table containing the reciprocal values of the input values. The reciprocal value $\hat{H}(w)^{-1}$ of the impulse response $\hat{H}(w)$ of the channel, which was converted into the frequency domain, is selected by the ROM 323 and then outputted to the coefficient bank 338 of the frequency domain equalizer 330.

Here, though the frequency response of the estimated channel has frequency bin that has zero, since the reciprocal is obtained through the ROM 323, the frequency response can be limited to a finite value, so that divergence can be prevented.

The frequency response of the inverse channel obtained by the ROM 323 is downloaded to the coefficient bank 338 that has a storage of FFT block size, and is used as initial coefficient for frequency domain equalization on a new coming data block.

Here, the coefficients may be downloaded whenever the training signal appears, or may be early downloaded only once and then adaptive equalization is performed continuously. One of the above-mentioned two methods may be selected or both of them may be used. It depends on a designer who implements the method.

The process in which the frequency domain equalizer 330 performs adaptive channel equalization in the frequency domain by using an LSM adaptive algorithm will be described.

In the channel equalization process using the LMS adaptive algorithm in the frequency domain, there are a process in which time domain linear convolution is replaced with a circular convolution by using FFT and duplicate storing method is used so that the result of the substituted circular convolution can be the same as that of the linear convolution, and a process in which filter coefficients are updated block by block in the frequency domain by using an LMS algorithm.

In other words, the conventional time domain equalizer outputs an output signal whenever an input signal (or a symbol) appears. The error signal is obtained from the output to update the coefficient used to equalize a next symbol. In the method of updating the coefficient block by block, all the input data of a block are equalized using the same coefficients. The coefficient to be used for the next input signal block is updated from an error signal block of the same size.

First, when a digital broadcast signal is received, the digital broadcast signal is demodulated by a demodulator 201, as shown in FIG. 2, digitalized and shifted to the base band. The first FFT unit 321 converts the received signal y(n) that was shifted to the base band to the frequency domain, and the signal Y(w) is outputted to the complex multiplier 331 of the frequency domain equalizer 330.

Here, when first FFT unit 321 converts the time domain input signal into the frequency domain, it should noticed that the linear convolution in the time domain is replaced by the circular convolution and so the duplicate storing method should be used so as to match the results of the linear convolution and the circular convolution. Accordingly, note that a block for FFT conversion should be configured so that the current data can overlap the previous data.

For example, supposing that the size of the FFT conversion block is N and N=2M (overlap ratio=50%), the k-th block is configured as equation 2.

$$y_k = [y(k*M-M) \ldots y(k*M-1) y(k*M) \ldots y(k*M+M-1)]^T \quad \text{Equation 2}$$

Accordingly, the time domain data which has a size N and is an overlapped input signal block is converted into N frequency bins by the FFT unit 321. The first complex multiplier 331 multiplies N frequency bins and the frequency bins of the same size N stored in the coefficient bank 338 by bin-by-bin multiplication.

Here, the bin-by-bin multiplication means multiplication of the same frequency bins. The bin-by-bin multiplication of two signals in the frequency domain corresponds to the circular convolution. The multiplication result of the first complex multiplier 331 corresponds to the equalized frequency bins. The equalized frequency bins are outputted to the IFFT unit 332 to be converted back into the time domain.

Supposing that the signal converted back into the time domain is z(n), z(n) is N time domain samples. If the overlap ratio is 50% for example, the M front samples contain aliasing components resulted from circular convolution, and the M rear samples include non-aliasing components as the result of the linear convolution.

Accordingly, though not shown in FIG. 2, an extractor for extracting M samples as the result of the linear convolution from the N samples is implicitly added to the rear of the IFFT unit 332.

The M time domain signal z(n) obtained as described above can be the sum of the value $\hat{x}(n)$ which was equalized with equalization coefficients obtained from the previous block and the amplified colored noise v(n). The amplified colored noise of the signal is whitened by the amplified noise canceling filter of the noise canceller 400. The whitened value is the final output of the equalizer and inputted to an error compensation block 202, shown in FIG. 2. The error compensation block 202 compensates the phase and the error of the data and outputs the compensated data for an error correction.

The final output from which an amplified noise is eliminated is inputted to the decision unit 341 so as to generate an error for updating new equalization coefficient.

The decision unit 341 outputs the decision values nearest to the output of the equalizer to the multiplexer 343. The multiplexer 343 is a kind of selector. The multiplexer 343 selectively outputs a training sequence of a training signal generator 342 in a training signal duration and the output value of the decision unit 341 in a data duration, as an ideal value or a reference value. In other words, the output of the multiplexer 343 is outputted to the noise canceller 400 and the subtracter 344.

The subtracter 344 obtains the difference between the reference value outputted through the multiplexer 343 and the output value of the frequency domain equalizer 330. The difference is the error signal. This error signal is inputted to the third FFT unit 333 and converted into the frequency domain.

Here, since the third FFT unit 333 has the block size of N and M error signals are actually generated, M zeros are augmented to a front of the M error signals to expand the augmented error signal to have the size of 2M=N and the expanded error signal to the third FFT unit 333.

The frequency domain error signal E(w) outputted from the third FFT unit 333 is outputted to the second complex multiplier 334. The complex conjugate of the received frequency domain signal Y(w) outputted from the first FFT unit 321 is outputted to the second complex multiplier 334 though a complex conjugate generator 335.

For example, if the received frequency domain signal outputted from the first FFT unit 321 is a+jb, the complex conjugate of the received frequency domain signal outputted from the complex conjugate generator 335 is a−jb. In other words, the complex number whose real part 'a' has a same sign and whose imaginary part 'jb' has an opposite sign is a complex conjugate.

The second complex multiplier 334 multiplies the output of the third FFT unit 333 and the output of the complex conjugate generator 335 and outputs the multiplication result to the multiplier 336. Here, the calculation of the second complex multiplier 334 corresponds to the time domain circular cross-correlation value.

The frequency domain signal of the circular cross-correlation value obtained above is inputted to the multiplier 336 and multiplied with step size (α) to be outputted to the adder 337.

The adder 337 adds the output of the multiplier 336 and the existing coefficient outputted from the coefficient bank 338 to update the coefficient. In other words, the output of the multiplier 336 is added to the existing coefficient stored in the coefficient bank 338 so that the coefficient for frequency domain equalization of the next block is regenerated. Similarly, in the coefficient updating calculation of the adder 337, the same frequency bins should be added to update the coefficient.

The coefficient updating method described until now is also called 'unconstrained coefficient updating method'. Because of the simplicity of the structure, the unconstrained coefficient updating method is widely used in spite of its slow convergence speed. Here, the term "unconstrained" is originated from the ignorance of a restriction condition in that the length of the coefficient should exist by the number of M.

The unconstrained coefficient updating method is an embodiment of the present invention. In the present invention, the coefficient can be updated in the constrained coefficient updating method. In other words, the output of the second complex multiplier 334 is converted into the time domain through the IFFT unit. The M front coefficient updating components is obtained and the M rear components are replaced with zeros. The changed output of the IFFT unit is converted in FFT conversion and the converted result is used as frequency domain coefficient updating component. This method is called constrained coefficient updating method. However, if a large amount of latency is caused in implementing FFT or IFFT as a hardware, the delay value in a feedback loop becomes larger, so that the performance may be lowered compared with the unconstrained coefficient updating method. Therefore, this method needs an attention during its use.

Hereinafter, a process of eliminating an amplified noise by using the noise predictor of the noise canceller 400 will be described in detail.

First, the transmission signal x(n) is converted into an analog signal, and the analog signal is modulated and then transmitted to the receiver through the channel. An impulse response of a discrete equivalent channel representing the whole procedures of re-sampling the resulting signal at a symbol rate after a carrier and symbol recovery is provided as "h(n)". At this point, as described above, a received signal y(n) can be expressed by a convolution of the transmission signal x(n) and the impulse response h(n). Herein, the process of eliminating the amplified noise from the output of the equalizer will be described conceptually and then in detail. For the sake of convenience, it is assumed that the impulse response h(n) of the discrete equivalent channel is given by the following Equation 3.

$$h(n)=\delta(n)+\delta(n-1)$$ [Equation 3]

Figure 3A:
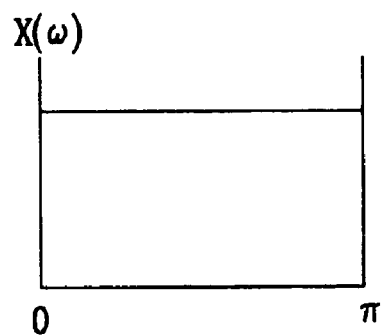
FIGS. 3A to 3H illustrate frequency spectra to teach the operation of a amplified noise canceller shown in FIG. 2.
Figure 3B:
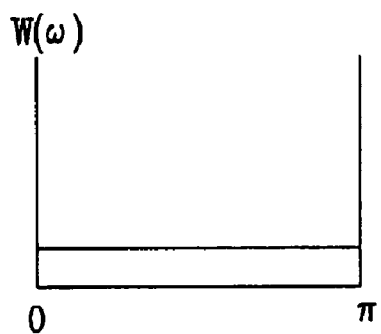
Figure 3C:
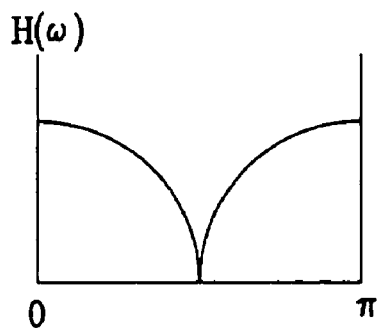
Figure 3D:
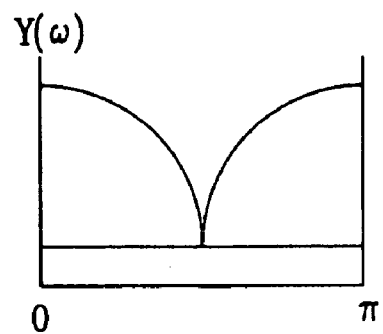
Figure 3E:
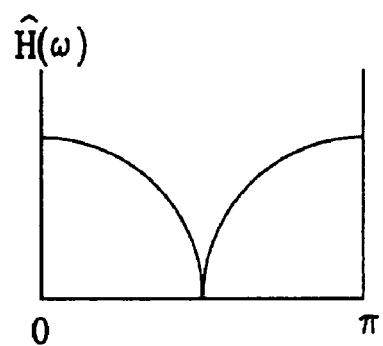
Figure 3F:
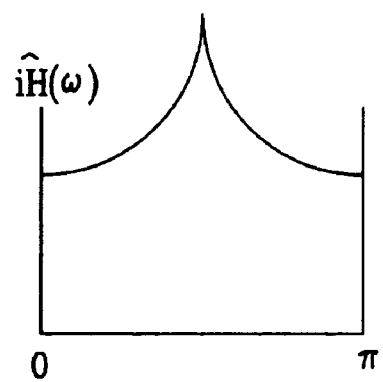
Figure 3G:
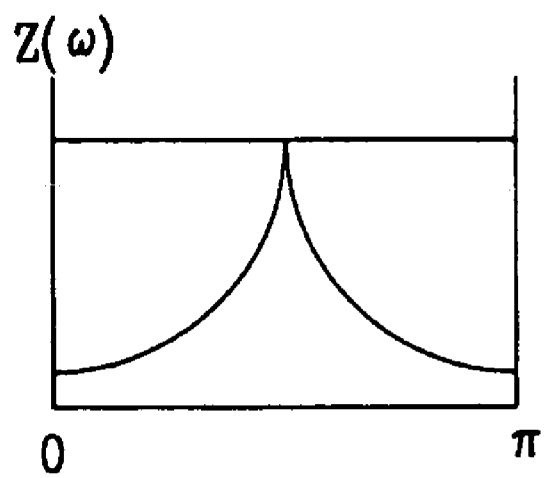
Figure 3H:
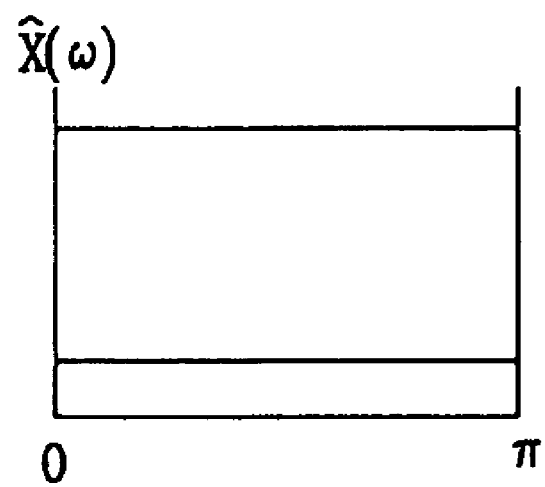

Since the frequency spectrum X(w) of the transmission signal has no distortion, the frequency spectrum X(w) is represented like FIG. 3A and the white noise added to the reception signal is represented like FIG. 3B. At this point, a frequency response H(w) of the channel given by the Equation 3 is represented like FIG. 3C and a frequency response Y(w) of the channel passed signal y(n) is represented like FIG. 3D. If it is assumed that the channel estimator 210 accurately estimates the channel, a frequency response $\hat{H}$(w) of the estimated channel is represented like FIG. 3E and a spectrum of the converged frequency domain equalizer coefficient for channel distortion compensation, i$\hat{H}$(w) is represented like FIG. 3F. Accordingly, a multiplication of $\hat{Y}$(w) and i$\hat{H}$(w) is represented like FIG. 3G. It can be seen from FIGS. 3A to 3G that the output of the equalizer consists of the recovered original signal and a colored noise signal that is amplified while a signal passes through the equalizer. Accordingly, the noise canceller 400 of the present invention estimates the colored noise and subtracts the estimated colored noise from the actual colored noise. This is a kind of a noise-whitening filter for whitening only noise, as shown in FIG. 3H.

Hereinafter, an operation of the noise canceller 400 will be described in detail.

As described above, assuming that the frequency domain equalization is completely achieved in the channel distortion compensator 300, the input signal of the noise canceller 400 consists of a sum of the original signal and the colored noise. In other words, if the input signal of the noise canceller 400 is q(n), q(n) is given by the following Equation 4.

$$q(n)=x(n)+v(n)=x(n)+\Sigma h^{-1}(k)w(n-k)$$ [Equation 4]

where, x(n) is an ideally equalized original signal and v(n) is a colored noise that is generated by a convolution of an impulse response of an inverse channel and a white noise w(n) added in a reception.

Accordingly, using the fact that v(n) is correlative with a previous value, the noise predictor 410 of the noise canceller 400 obtains $\hat{v}$(n) that is forward-predicted by projecting the colored noise v(n) on a plane spanned by the set of random vectors, {v(n−1), v(n−2), . . . , v(n−L)}. If the subtracter 420 subtracts the predicted $\hat{v}$(n) from v(n), the elimination of the amplified noise is achieved. In other words, the noise amplified in the equalization can be eliminated by whitening v(n) through the subtraction of the predicted value $\hat{v}$(n) from v(n).

Figure 4:
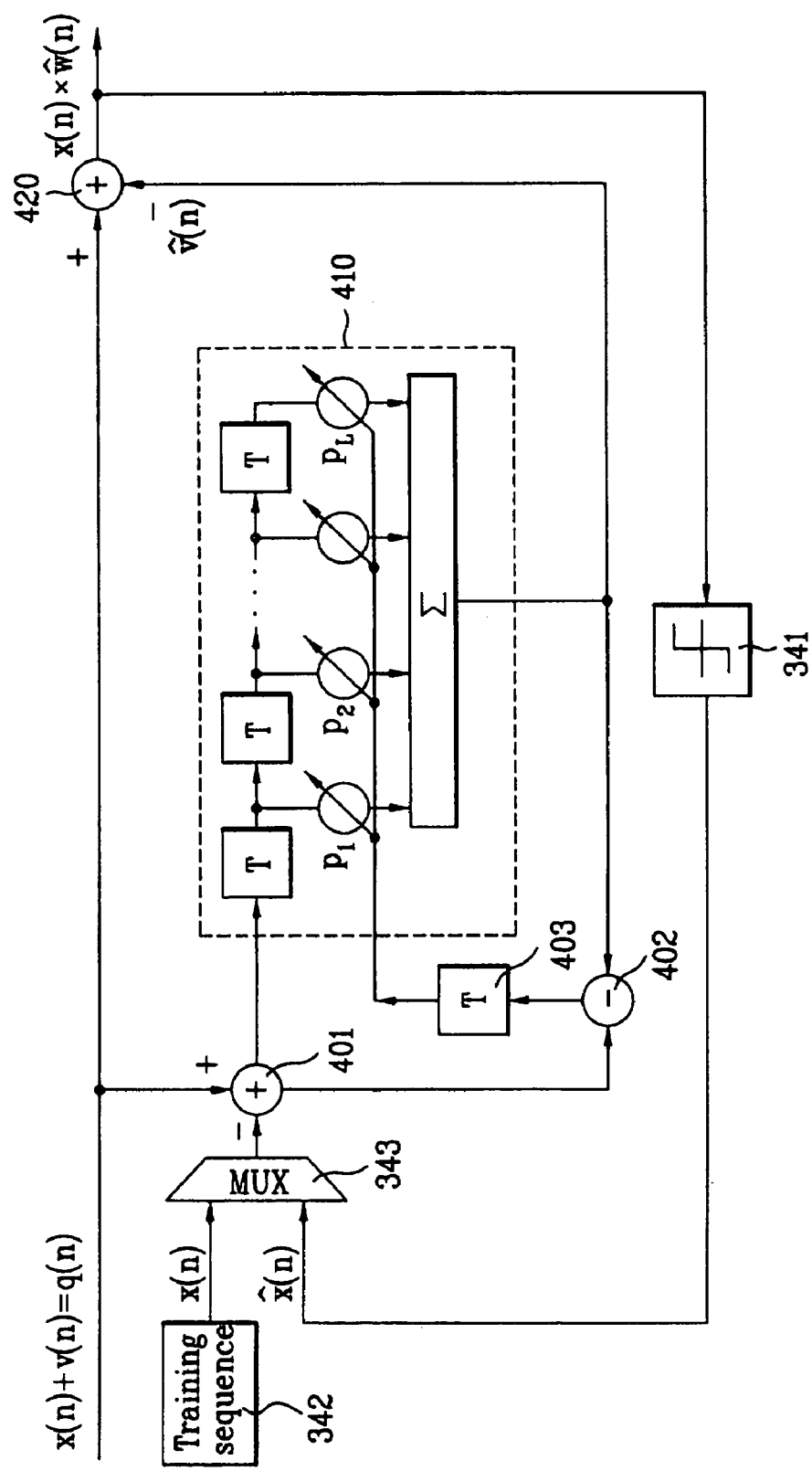
FIG. 4 is a detailed block diagram illustrating the noise canceller shown in FIG. 2.

FIG. 4 is a detailed block diagram of the noise canceller 400. The noise canceller 400 includes: a first subtracter 401 for extracting only the colored noise v(n) by subtracting an output of a MUX 343 from an output of the channel distortion compensator 300, in which the multiplexer 343 selects a training sequence during a training signal period and a decision value of a noise-eliminated signal during a data period, respectively; a noise predictor 410 for delaying an output of the first subtracter 401 in sequence and predicting v(n) by using the delayed values v(n−1), . . . , v(n−L) to thereby generate $\hat{v}$(n); and a second subtracter 420 for whitening noise by subtracting the predicted noise $\hat{v}$(n) from an output q(n) of the channel distortion compensator 300, and outputting the equalized data with whitened noise to the FEC and the decision unit 341. Here, the decision unit 341 selects a decision value that is closest to a signal whose amplified noise is eliminated by the second subtracter 420 of the noise canceller 400, that is, a signal whose noise is whitened, and then outputs the selected decision value to the multiplexer 343. The decision unit 341, the training signal generator 342 and the multiplexer 343 are a block shared by both the channel distortion compensator 300 and the noise canceller 400.

A third subtracter 402 and a delay unit 403, which are not described in FIG. 4, are provided for controlling a coefficient updating of the noise predictor 410. The third subtracter 402 calculates a difference between the output of the first subtracter 401 and the output of the noise predictor 410 and then outputs the calculated difference to the delay unit 403. The delay unit 403 delays the inputted difference by unit time and then outputs the delayed signal to the respective multipliers of the noise predictor 410.

Referring to FIG. 4, the output q(n) of the channel distortion compensator 300 includes the original signal x(n) and the colored noise v(n) together, as can be seen in Equation 4. The signal q(n) is outputted to the first and second subtracters 401 and 420 of the noise canceller 400.

The first subtracter 401 extracts only the colored noise signal v(n) by subtracting the original signal from the output q(n) of the channel distortion compensator 300. Here, the original signal is a signal outputted through the multiplexer 343.

At this point, when the multiplexer 343 outputs the original signal to the first subtracter 401, it selectively outputs the training sequence during the training period and the decision value of the noise-eliminated signal during the data period.

The colored noise signal v(n) extracted by the first subtracter 401 is inputted to a first delay unit of a serial configuration of the noise predictor 410. Each multiplier multiplies an output of each delay unit of the noise predictor 410 by the coefficient of predictor. Then, the results of the multipliers are added by the adder and outputted to the second adder 420. At this point, if the coefficient of the noise predictor 410 exists after the signal passes through the first delay unit, the output $\hat{v}(n)$ of the noise predictor 410 is given by Equation 6, not Equation 5.

$$\hat{v}(n) = \sum_{k=0}^{L} p_k v(n-k) \quad \text{[Equation 5]}$$

$$\hat{v}(n) = \sum_{k=1}^{L} p_k v(n-k) \quad \text{[Equation 6]}$$

where, $p_k$ is a k-th coefficient of the noise predictor 410 and L is an order of the noise predictor 410.

A cost function J is defined as a mean square prediction error as follows:

$$J \equiv E\{e(n)^2\} = E\{(v(n) - \hat{v}(n))^2\} = E\{v(n) - \sum_{k=1}^{L} p_k v(n-k)^2\} \quad \text{[Equation 7]}$$

where, E is an operation of calculating a probable expectation and e(n) is a prediction error.

If the cost function J is differentiated with respect to $P_k$ in order to calculate $P_k$ (k=1, 2, . . . , L) that minimize the cost function J, the result is given by Equation 8.

$$\frac{\partial J}{\partial p_k} = -2 \cdot E\{e(n) \cdot v(n-k)\} \quad \text{[Equation 8]}$$

If an instantaneous value is used instead of the probable expectation in order to update coefficient using LMS algorithm, the result is given by Equation 9.

$$E\{e(n) \cdot v(n-k)\} \approx e(n) \cdot v(n-k) \quad \text{[Equation 9]}$$

Accordingly, if $P_k(n)$ is a k-th prediction coefficient that is updated at n-th time, the updating equation of coefficient with respect to time is given by Equation 10.

$$p_k(n+1) = p_k(n) + \mu \cdot e(n) \cdot v(n-k), \ (k=1, 2, \ldots, L) \quad \text{[Equation 10]}$$

The output $\hat{v}(n)$ predicted using the updated coefficient is directly inputted to the second subtracter 420, then whitening the noise of the signal q(n). Here, the coefficient is updated under a control of the third subtracter 402 and the delay unit 403.

Accordingly, the output r(n) of the noise canceller 400 is given by Equation 11.

$$r(n) = x(n) + \hat{w}(n) = x(n) + (v(n) - \hat{v}(n)) \quad \text{[Equation 11]}$$

where, $\hat{w}(n)$ represents a whitened noise. The output of the noise canceller 400 is a signal whose channel is equalized and whose noise is eliminated, and a signal that is almost identical to the original signal.

Accordingly, since the value of Equation 11 can be considered identical to the decision value of the decision unit or the original signal, the performance of the noise predictor 410 is not degraded even if the noise predictor 410 is operated using only the decided data value at the input terminal without using the training signal.

Figure 5:
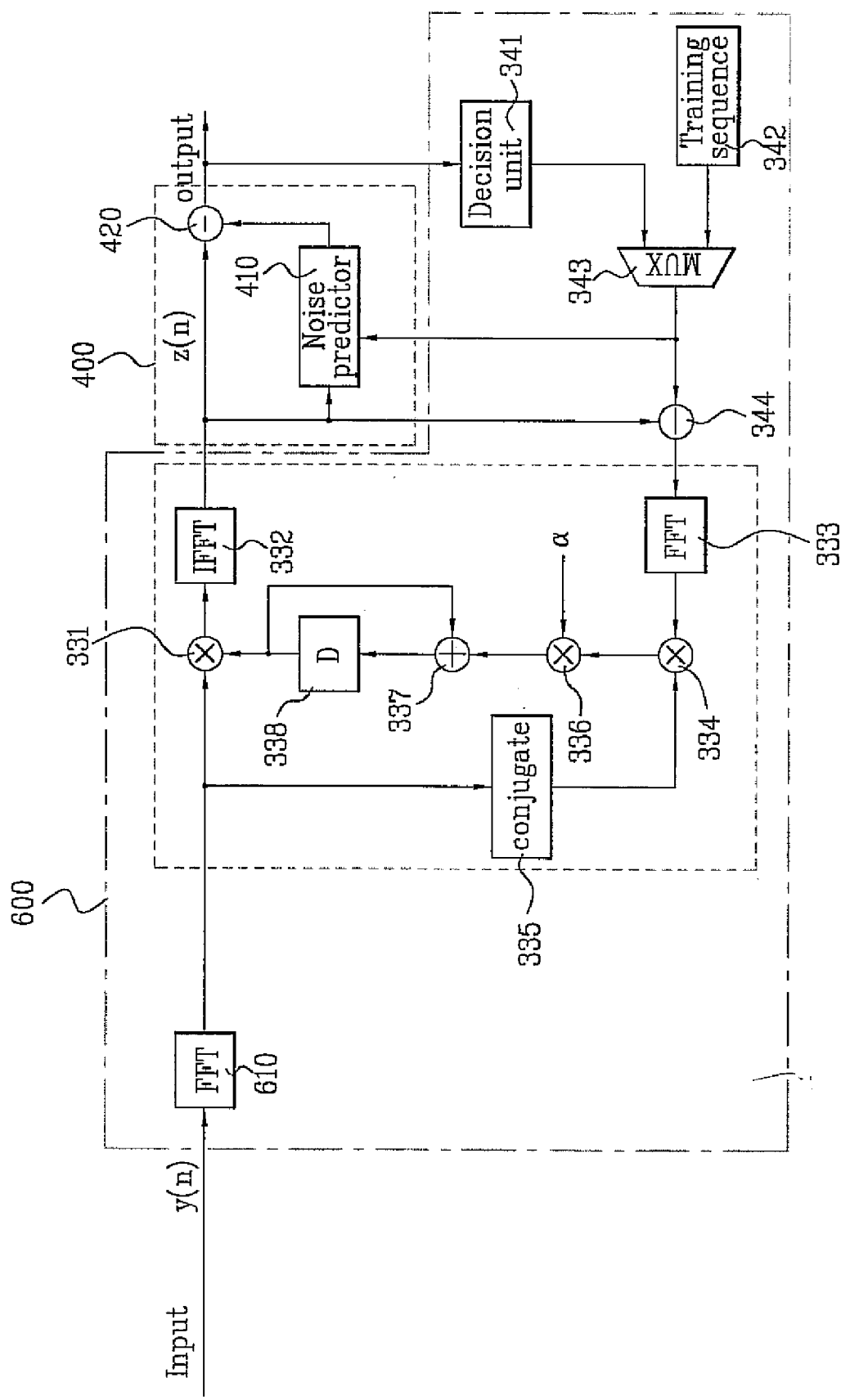
FIG. 5 illustrates a configuration of a channel equalizer operating in a frequency domain according to an embodiment of the present invention.

FIG. 5 is a block diagram of a channel equalizer according to another embodiment of the present invention, in which the channel estimator is not used.

Referring to FIG. 5, the channel equalizer in the frequency domain includes a channel distortion compensator 600 and a noise canceller 400. In FIG. 5, the channel estimator and the FFT for converting the transmission channel estimated by the channel estimator into the frequency domain are not used and the operations of the other blocks are equal to those described in FIG. 2.

In other words, the received signal y(n) is converted into the frequency domain signal in a first FFT unit 610 and then outputted to a complex multiplier 331 and a complex conjugate generator 335. A coefficient bank 338 stores a coefficient outputted from an adder 337. The stored coefficient is outputted to the complex multiplier 331 and fed back to the adder 337 in order to update the coefficient at the same time.

Meanwhile, according to another embodiment of the present invention, the channel equalizer can be also configured with only the channel estimator and the channel distortion compensator in the frequency domain. In other words, in this case, the noise canceller is not used. At this point, the operations of the channel estimator and the channel distort compensator are equal to those described in FIG. 2.

The channel estimator for use in the digital TV receiver according to the present invention has following effects.

First, since the channel estimator of the present invention has a serially-connected configuration of the linear equalizer and the amplified-noise canceller, it does not undergo an error propagation situation occurring in the time-domain DFE. Therefore, a stable equalization can be achieved even at extreme multiple path channels or channel situation such as SFN.

Second, the channel is estimated using the training signal and the frequency response of the inverse channel is obtained using the information on the estimated channel. The corresponding value is used as an initial coefficient of the frequency-domain equalizer. The equalization is performed using the LMS adaptive algorithm during the data period. Therefore, a consistent performance can be obtained regardless of the estimated channel error.

Third, since the accuracy of the channel estimator does not greatly influence the performance of the equalizer, it is possible to use a simple channel estimator using a single correlation value. As a result, hardware for the channel estimator can be reduced in size.

Fourth, since the inverse channel information of the estimated channel is used only as the frequency-domain equalization coefficient and the coefficient continues to be updated during the data period using the LMS adaptive algorithm, the channel distortion compensation can be achieved with respect to the time-varying channel, i.e., the channel that is varied between the training signals, or a dynamic ghost channel. Therefore, a good performance can be obtained in a mobile reception environment.

Fifth, in situation such that the positions of the main path and the reflective path are changed occasionally, the time-domain equalizer suffers from the degradation in the equalization performance. However, the frequency-domain equalizer using the channel estimator of the present invention does not cause such degradation. Therefore, the frame synchronization of the output of the equalizer is always constant, thus making it possible to maintain the frame synchronization securely.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A channel equalizer for restoring an original signal from a digital television received signal that past through a channel, the channel equalizer comprising:

a channel estimator for estimating an impulse response of a transmission channel from a received signal having past through the transmission channel;

a channel distortion compensator for converting the received signal and the estimated impulse response of the transmission channel into frequency domain signals, setting a reciprocal of the estimated impulse response of the transmission channel in a frequency domain as an initial coefficient, receiving a channel equalized signal fed back in a data duration, calculating the error between equalized signal and decision value of the same equalized signal, updating the coefficients by using the error between equalized signal and decision value of the same equalized signal continuously, compensating distortion of the received signal converted into the frequency domain, and converting the compensated received signal back into a time domain; and a noise canceller for predicting a noise from an output of the channel distortion compensator, the noise being amplified when equalized, and eliminating the amplified noise contained in the time domain signal outputted from the channel distortion compensator.

2. The channel equalizer of claim 1, wherein the channel estimator detects a training period, calculates a cross-correlation between a training signal past through the channel during the training period and a training signal preset by a receiver, and outputs the calculated cross-correlation as the impulse response of the estimated transmission channel.

3. The channel equalizer of claim 1, wherein the channel estimator detects a training period, calculates a cross-correlation between a training signal past through the channel during the training period and a training signal preset by a receiver, multiplies the cross-correlation and an inverse matrix of an auto-correlation matrix of the training signal, and outputs the multiplication result as the impulse response of the estimated transmission channel.

4. The channel equalizer of claim 1, wherein the channel estimator detects a training period, calculates a cross-correlation between a training signal past through the channel during the training period and a training signal preset by a receiver, multiplies the cross-correlation and an inverse matrix of an auto-correlation matrix of the training signal, and outputs an average of the multiplication result and the estimated impulse response of the transmission channel of a previous frame as the estimated impulse response of the transmission channel of the current frame.

5. The channel equalizer of claim 1, wherein the channel distortion compensator comprises:

a first fast Fourier transform (FFT) unit for converting the received signal from the time domain into the frequency domain;

a second FFT unit for converting the impulse response of the transmission channel estimated by the channel estimator from the time domain into the frequency domain;

a ROM for in advance tabling and storing frequency responses corresponding to an inverse channel of the transmission channel of the frequency domain, and selectively outputting a frequency response corresponding to an inverse channel of the estimated transmission channel, which was outputted from the second FFT unit; and a frequency domain equalizer for receiving the frequency response of the inverse channel outputted from the ROM, setting the frequency response of the inverse channel as an initial coefficient, receiving a channel equalized signal fed back in data duration, calculating the error between equalized signal and decision value of the same equalized signal, updating the coefficients by using the error between equalized signal and decision value of the same equalized signal continuously, compensating the distortion of the received signal converted into the frequency domain, and converting the compensated received signal back into the time domain.

6. The channel equalizer of claim 5, wherein the first FFT unit overlaps a received data block whose length is M and a previous data block, and converts the received data block into the frequency domain.

7. The channel equalizer of claim 5, wherein the second FFT unit augments zeros to the impulse response of the estimated channel, whose length is M, so that a size of the augmented impulse response matches a size N of an FFT block, and converts the augmented impulse response into the frequency domain.

8. The channel equalizer of claim 5, wherein the frequency domain equalizer comprises:

a coefficient bank for receiving the frequency response of the inverse channel outputted from the ROM, selling the frequency response of the inverse channel as an initial coefficient for frequency domain equalization, and storing and outputting coefficients that are updated continuously in the data duration;

a first complex multiplier for multiplying the received frequency domain signal outputted from the first FFT unit and a coefficient outputted from the coefficient bank and compensating the channel distortion contained in the received frequency domain signal;

an IFFT unit for converting the received frequency domain signal, which is outputted from the first complex multiplier and from which distortion was compensated, back into the time domain;

a third FFT unit for receiving an error signal, a difference between an output of the IFFT unit and the signal from which a noise was eliminated by the noise canceller, and converting the error signal into the frequency domain;

a complex conjugate generator for outputting complex conjugate values of the received frequency domain signal outputted from the first FFT unit;

a second complex multiplier for multiplying an output of the third FFT unit and an output of the complex conjugate generator;

a multiplier for multiplying an output of the second complex multiplier and a step size ($\alpha$); and an adder for adding an output of the multiplier and a previous coefficient fed back from the coefficient bank thereby updating a coefficient, and outputting the updated coefficient to the coefficient bank.

9. The channel equalizer of claim 8, wherein the frequency response of the inverse channel is inputted to the coefficient bank whenever the training signal is inputted.

10. The channel equalizer of claim 8, wherein the frequency response of the inverse channel is early inputted only once to the coefficient bank, and then channel equalized data is fed back to update the coefficient.

11. The channel equalizer of claim 8, wherein the IFFT unit extracts only rear M samples from N signals converted into the time domain and outputs the extracted rear M samples to the noise canceller.

12. The channel equalizer of claim 8, wherein the third FFT unit augments zeros to a front of the error signal whose length is M so that a size of the augmented error signal matches a size N of an FFT block, and converts the augmented error signal into the frequency domain.

13. The channel equalizer of claim 8, wherein the noise canceller comprises:

a noise predictor for extracting only colored noises from an output of the channel distortion compensator by using the output of the channel distortion compensator and a decision value of a signal from which an amplified noise is eliminated and which is fed back, and predicting the noise amplified during equalization; and a first subtracter for subtracting the noise predicted by the noise predictor from the output of the channel distortion compensator, thereby whitening the noise.

14. The channel equalizer of claim 13, wherein the noise canceller further comprises:

a decision unit connected to an output terminal of the noise canceller, for outputting a decision value nearest to a noise canceller output signal that the amplified noise is eliminated;

a multiplexer for selectively feeding back the training signal during a training period and a decision value of the signal that the noise is eliminated during a data period to the noise predictor; and a second subtracter for outputting as an error signal a difference between a signal outputted through the multiplexer and an output signal of the channel distortion compensator to the third FFT unit of the channel distortion compensator.

15. A channel equalizer for restoring an original signal from a digital television received signal that past through a channel, the channel equalizer comprising:

a channel distortion compensator for converting the received signal into a frequency domain, receiving a channel equalized signal fed back, calculating the error between equalized signal and decision value of the same equalized signal, updating the coefficients by using the error between equalized signal and decision value of the same equalized signal continuously, compensating distortion of the received signal converted into the frequency domain, and converting the compensated received signal back into a time domain; and a noise canceller for predicting a noise from an output of the channel distortion compensator, the noise being amplified when channel equalization is performed, eliminating the amplified noise contained in the time domain signal outputted from the channel distortion compensator, and feeding the time domain signal back to the channel distortion compensator so as to update a coefficient.

16. The channel equalizer of claim 15, wherein the channel distortion compensator comprises:

a first fast Fourier transform (FFT) unit for converting the received signal from the time domain into the frequency domain;

a coefficient bank for storing and outputting coefficients that are updated continuously in the data duration;

a first complex multiplier for multiplying the received frequency domain signal outputted from the first FFT unit and a the coefficient outputted from the coefficient bank and compensating the channel distortion contained in the received frequency domain signal;

an IFFT unit for converting the received frequency domain signal, which is outputted from the first complex multiplier and from which distortion was compensated, back into the time domain;

a second FFT unit for receiving as an error signal a difference between an output of the IFFT unit and the signal from which a noise was eliminated by the noise canceller, and converting the error signal into the frequency domain;

a complex conjugate generator for outputting complex conjugate values of the received frequency domain signal outputted from the first FFT unit;

a second complex multiplier for multiplying an output of the second FFT unit and an output of the complex conjugate generator;

a multiplier for multiplying an output of the second complex multiplier and a step size ($\alpha$); and an adder for adding an output of the multiplier and a previous coefficient fed back from the coefficient bank thereby updating a coefficient, and outputting the updated coefficient to the coefficient bank.

17. The channel equalizer of claim 16, wherein the first FFT unit overlaps a received data block whose length is M and a previous data block, and converts the received data block into the frequency domain.

18. The channel equalizer of claim 16, wherein the IFFT unit extracts only rear M samples from signals converted into the time domain and outputs the extracted rear M samples to the noise canceller.

19. The channel equalizer of claim 16, wherein the second FFT unit augments zeros to a front of the error signal whose length is M so that the size of the augmented error signal matches the size N of an FFT block, and converts the augmented error signal into the frequency domain.

20. The channel equalizer of claim 15, wherein the noise canceller comprises:

a noise predictor for extracting only colored noise from an output of the channel distortion compensator by using the output of the channel distortion compensator and a decision value of a signal from which an amplified noise is eliminated and which is fed back, and predicting the noise amplified during the equalization; and
a first subtracter for subtracting the noise predicted by the noise predictor from the output of the output of the channel distortion compensator, thereby whitening the noise.

21. The channel equalizer of claim 20, wherein the noise canceller further comprises:
a decision unit connected to an output terminal of the noise canceller, for outputting a decision value nearest to a signal that the amplified noise is eliminated from the noise canceller;
a multiplexer for selectively feeding back the training signal during a training period and a decision value of the signal that the noise is eliminated during a data period to the noise predictor; and
a second subtracter for outputting as an error signal a difference between a signal outputted through the multiplexer and an output signal of the channel distortion compensator to the second FFT unit of the channel distortion compensator.

22. The channel equalizer of claim 15, further comprising:
a channel estimator positioned at a front of the channel distortion compensator, for estimating an impulse response of a transmission channel from a received signal having past though the transmission channel, converting the estimated impulse response into the frequency domain, and downloading a reciprocal of the estimated impulse response of the transmission channel in a frequency domain as an initial coefficient of the channel distortion compensator for the equalization in the frequency domain.

23. A channel equalizer for restoring an original signal from a digital television received signal that past through a channel, the channel equalizer comprising:
a channel estimator for estimating an impulse response of a transmission channel from a received signal having past through the transmission channel; and
a channel distortion compensator for converting the received signal and the estimated impulse response of the transmission channel into frequency domain signals, setting a reciprocal of the estimated impulse response of the transmission channel in a frequency domain as an initial coefficient, receiving a channel equalized signal fed back in data duration, calculating the error between equalized signal and decision value of the same equalized signal, updating the coefficients by using the error between equalized signal and decision value of the same equalized signal continuously, compensating distortion of the received signal converted into the frequency domain, and converting the compensated received signal back into a time domain.

24. The channel equalizer of claim 23, wherein the channel estimator detects a training period, calculates a cross-correlation between a training signal past through the channel during the training period and a training signal preset by a receiver, and outputs the calculated cross-correlation as the estimated impulse response of the transmission channel.

25. The channel equalizer of claim 23, wherein the channel estimator detects a training period, calculates a cross-correlation between a training signal past through the channel during the training period and a training signal preset by a receiver, multiplies the cross-correlation and an inverse matrix of an auto-correlation matrix of the training signal, and outputting the multiplication result as the estimated impulse response of the transmission channel.

26. The channel equalizer of claim 23, wherein the channel estimator detects a training period, calculates a cross-correlation between a training signal past through the channel during the training period and a training signal preset by a receiver, multiplies the cross-correlation and an inverse matrix of an auto-correlation matrix of the training signal, and outputs an average of the multiplication result and the estimated impulse response of a previous frame of the transmission channel as the estimated impulse response of the transmission channel of the current frame.

27. The channel equalizer of claim 23, wherein the channel distortion compensator comprises:
a first fast Fourier transform (FFT) unit for converting the received signal from the time domain into the frequency domain;
a second FFT unit for converting the impulse response of the transmission channel estimated by the channel estimator from the time domain into the frequency domain;
a ROM for in advance tabling and storing frequency responses corresponding to an inverse channel of the transmission channel of the frequency domain, and selectively outputting a frequency response corresponding to an inverse channel of the estimated transmission channel, which was outputted from the second FFT unit; and
a frequency domain equalizer for receiving the frequency response of the inverse channel outputted from the ROM, setting the frequency response as an initial coefficient, receiving a channel equalized signal fed back in data duration, calculating the error between equalized signal and decision value of the same equalized signal, updating the coefficients by using the error between equalized signal and decision value of the same equalized signal continuously, compensating the distortion of the received signal converted into the frequency domain, and converting the compensated received signal back into the time domain.

28. The channel equalizer of claim 27, wherein the first FFT unit overlaps a received data block whose length is M and a previous data block, and converts the received data block into the frequency domain.

29. The channel equalizer of claim 27, wherein the second FFT unit augments zeros to the impulse response of the estimated channel, whose length is M, so that a size of the augmented impulse response matches a size N of an FFT block, and converts the augmented impulse response into the frequency domain.

30. The channel equalizer of claim 27, wherein the frequency domain equalizer comprises:
a coefficient bank for receiving the frequency response of the inverse channel outputted from the ROM, setting the frequency response as an initial coefficient for frequency domain equalization, and storing and outputting coefficients that are updated continuously in the data duration;
a first complex multiplier for multiplying the received frequency domain signal outputted from the first FFT unit and a coefficient outputted from the coefficient bank and compensating the channel distortion contained in the received frequency domain signal;
an IFFT unit for converting the received frequency domain signal, which is outputted from the first complex multiplier and from which distortion was compensated, back into the time domain;
a third FFT unit for receiving as an error signal a difference between an output of the IFFT unit and the signal from which a noise was eliminated by the noise canceller, and converting the error signal into the frequency domain;

a complex conjugate generator for outputting complex conjugate values of the received frequency domain signal outputted from the first FFT unit;

a second complex multiplier for multiplying an output of the third FFT unit and an output of the complex conjugate generator;

a multiplier for multiplying an output of the second complex multiplier and a step size ($\alpha$); and an adder for adding an output of the multiplier and a previous coefficient fed back from the coefficient bank thereby updating a coefficient, and outputting the updated coefficient to the coefficient bank.

31. The channel equalizer of claim 30, wherein the frequency response of the inverse channel is inputted to the coefficient bank whenever the training signal is inputted.

32. The channel equalizer of claim 30, wherein the frequency response of the inverse channel is early inputted only once to the coefficient bank, and then channel equalized data is fed back to update the coefficient.

33. The channel equalizer of claim 30, wherein the IFFT unit extracts only rear M samples from N signals converted into the time domain and outputs the extracted rear M samples to the noise canceller.

34. The channel equalizer of claim 30, wherein the third FFT unit augments zeros to a front of the error signal whose length is M so that a size of the augmented error signal matches a size N of an FFT block, and converts the augmented error signal into the frequency domain.

35. The channel equalizer of claim 30 further comprises:
a noise canceller for predicting a noise from an output of the channel distortion compensator, the noise being amplified when equalized, and eliminating the amplified noise contained in the time domain signal outputted from the channel distortion compensator.

36. A digital television receiver comprising:
a demodulator for digitalizing a received signal and demodulating the digitalized signal into a base band signal;
a channel estimator for estimating an impulse response of a transmission channel from an output signal of the demodulator;
a channel distortion compensator for converting the received base band signal and the estimated impulse response of the transmission channel into frequency domain signals, setting a reciprocal of the estimated impulse response of the transmission channel in a frequency domain as an initial coefficient, receiving channel equalized data fed back in data duration, calculating the error between equalized signal and decision value of the same equalized signal, updating the coefficients by using the error between equalized signal and decision value of the same equalized signal continuously, compensating distortion of the received base band signal converted into the frequency domain, and converting the compensated received base band signal back into a time domain;
a noise canceller for predicting a noise from an output of the channel distortion compensator, the noise being amplified during equalization, and eliminating the amplified noise contained in the time domain signal outputted from the channel distortion compensator; and
an error compensator for compensating a phase and an error of data outputted from the noise canceller and outputting the compensated data for channel decoding.

37. The digital television receiver of claim 36, wherein the channel distortion compensator comprises:
a first fast Fourier transform (FFT) unit for converting the received base band signal from the time domain into the frequency domain;
a second FFT unit for converting the impulse response of the transmission channel estimated by the channel estimator from the time domain into the frequency domain;
a ROM for in advance tabling and storing frequency responses corresponding to an inverse channel of the transmission channel of the frequency domain, and selectively outputting a frequency response corresponding to an inverse channel of the estimated transmission channel, which was outputted from the second FFT unit; and
a frequency domain equalizer for receiving the frequency response of the inverse channel outputted from the ROM, setting the frequency response of the inverse channel as an initial coefficient, receiving a channel equalized data fed back in data duration, calculating the error between equalized signal and decision value of the same equalized signal, updating the coefficients by using the error between equalized signal and decision value of the same equalized signal continuously, compensating the distortion of the received base band signal converted into the frequency domain, and converting the compensated received base band signal back into the time domain.

38. The digital television receiver of claim 37, wherein the frequency domain equalizer comprises:
a coefficient bank for receiving the frequency response of the inverse channel outputted from the ROM, setting the frequency response as an initial coefficient for frequency domain equalization, and storing and outputting coefficients that are updated continuously in the data duration;
a first complex multiplier for multiplying the received frequency domain signal outputted from the first FFT unit and a coefficient outputted from the coefficient bank and compensating the channel distortion contained in the received frequency domain signal;
an IFFT unit for converting the received frequency domain signal, which is outputted from the first complex multiplier and from which distortion was compensated, back into the time domain;
a third FFT unit for receiving as an error signal a difference between an output of the IFFT unit and the signal from which a noise was eliminated by the noise canceller, and converting the error signal into the frequency domain;
a complex conjugate generator for outputting complex conjugate values of the received frequency domain signal outputted from the first FFT unit;
a second complex multiplier for multiplying an output of the third FFT unit and an output of the complex conjugate generator;
a multiplier for multiplying an output of the second complex multiplier and a step size ($\alpha$); and
an adder for adding an output of the multiplier and a previous coefficient fed back from the coefficient bank thereby updating a coefficient, and outputting the updated coefficient to the coefficient bank.

39. The digital television receiver of claim 36, wherein the noise canceller comprises:
a noise predictor for extracting only colored noise from an output of the channel distortion compensator by using the output of the channel distortion compensator and a decision value of a signal from which an amplified noise is eliminated and which is fed back, and predicting the noise amplified during equalization; and a first subtracter for subtracting the noise predicted by the noise predictor from the output of the channel distortion compensator, thereby whitening the noise.

40. The digital television receiver of claim 39, wherein the noise canceller further comprises:

a decision unit connected to an output terminal of the noise canceller, for outputting a decision value nearest to a signal which is outputted from the noise canceller and from which the amplified noise is eliminated;

a multiplexer for feeding the training signal back to the noise predictor in a training period and feeding back the decision value nearest to the signal from which the noise was eliminated to the noise predictor in a data duration; and a second subtracter for outputting as an error signal a difference between a signal outputted through the multiplexer and an output signal of the channel distortion compensator to the third FFT unit of the channel distortion compensator.

\* \* \* \* \*